T. C. DOBBINS.
DUST GUARD FOR VEHICLES.
APPLICATION FILED SEPT. 3, 1914.
1,125,274.
Patented Jan. 19, 1915.
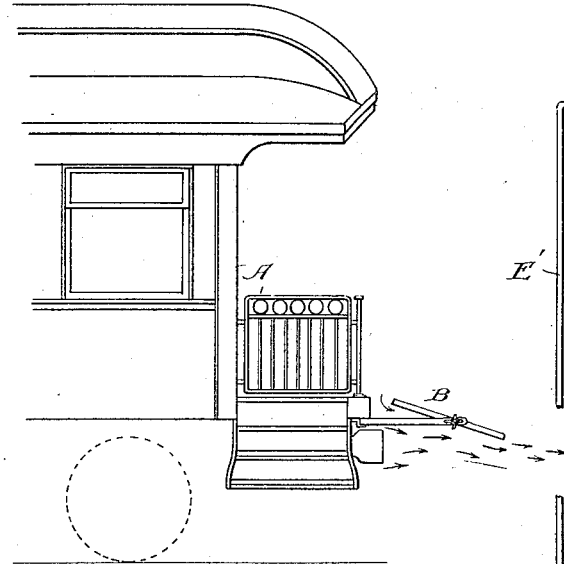
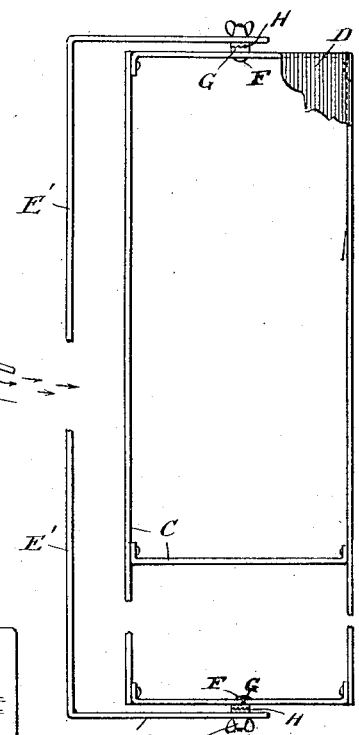
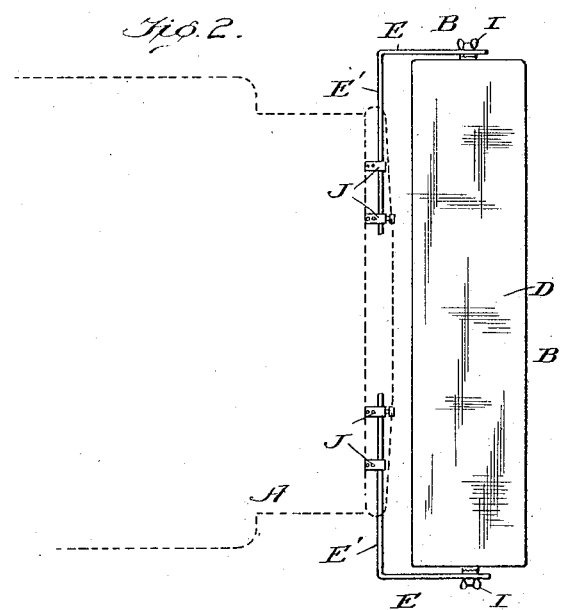
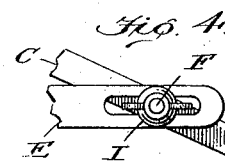
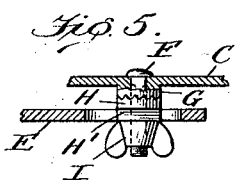
Witnesses
Edwin L. Bradford
James Crawford
Inventor
Timothy C. Dobbins
By Wallace Greene,
Attorney

UNITED STATES PATENT OFFICE.

TIMOTHY C. DOBBINS, OF WALNUT PARK, CALIFORNIA.

DUST-GUARD FOR VEHICLES.

1,125,274. Specification of Letters Patent. Patented Jan. 19, 1915.

Application filed September 3, 1914. Serial No. 860,070.

*To all whom it may concern:*

Be it known that I, TIMOTHY C. DOBBINS, a citizen of the United States, residing at Walnut Park, in the county of Los Angeles and State of California, have invented certain new and useful Improvements in Dust-Guards for Vehicles, of which the following is a specification, reference being had therein to the accompanying drawing.

This invention relates to dust controlling devices for use on vehicles such as automobiles, cars and the like, which move more or less rapidly, and its object is to throw all the dust rising near the rear of the vehicle rearward near the ground so that persons in or upon an open vehicle or the rear observation platform thereof may be free from annoyance by dust. For illustration the devices are shown as applied to an observation car such as is used upon railways.

In the accompanying drawings, Figure 1 is a side elevation of a portion of a car provided with my devices. Fig. 2 is a plan view, the car being indicated in dotted lines. Fig. 3 is a plan view of the frame of an air deflector seen in Figs. 1 and 2. Figs. 4 and 5 are detail views illustrating the pivotal mounting of the deflector.

In these views, A represents the rear portion of an observation car without novelty, and B are air deflectors mounted a short distance in the rear of the car and preferably extending laterally beyond the planes of the car's side walls. This deflector is preferably in general character a plane rectangular structure of a width much less than its length, and for lightness it may consist of a suitable frame C inclosed in strong oiled canvas D, or the like, unaffected by sun or rain. The frame is mounted between bars E by means of pivotal bolts F, the frame being provided with radially corrugated bosses G surrounding each bolt and engaged by similarly corrugated washers H each having a rib H' which slides in a slot in the corresponding bar E in adjusting the distance of the frame from the car. Suitable nuts I lock the frame to the bars and also lock the frame against rotation about the bolts when it has been set at any desired inclination.

The arms or bars E are detachably secured to the car in any suitable way as by bending them at right angles, inserting the inwardly turned end portions E' in clips J and securing them by set-screws, and in any case they are preferably at such height from the roadway that the forward edge of the deflector may be approximately in the plane of the car floor when the devices are used upon a car.

When the devices are in place, the deflector is inclined rearwardly downward and locked in position, the inclination being varied inversely with the probable speed of the vehicle. If now the car advances rapidly, air striking the deflector passes along its lower face and escapes beneath its lower edge forming a rapid current carrying dust which is drawn from the entire region of the platform and which rises to the plane of the platform many feet in the rear of the car, the current, however, meantime impinging only slightly upon the roadway. Were the deflector not extended beyond the planes of the car's side walls experience proves that some dust will rise outside those planes and cause annoyance, but when it is slightly extended, as shown, the current seems to draw such dust inward and the annoyance is avoided.

What I claim is:

1. The combination with a vehicle, of arms fixed to the vehicle and projecting, approximately in the plane of its floor, to the rear of the vehicle, and an air deflector mounted between said arms, normally inclined downwardly and rearwardly and separated from the vehicle by an open space, and means for adjusting at will the inclination of the deflector.

2. The combination with a vehicle, of an approximately horizontal, downwardly and rearwardly inclined air deflector supported from and at some distance in the rear of the vehicle body, and means for slightly varying the inclination of the deflector at will, according to the probable speed of the vehicle.

3. The combination with a passenger road vehicle, of a downwardly and rearwardly inclined air deflector approximately in the plane of the floor of the vehicle and supported by the latter, and means for at will adjusting the angle of inclination of the deflector.

4. The combination with a vehicle, of fixed arms projecting rearwardly from the body thereof, and an air deflector spaced from the vehicle, pivoted between said arms, inclined downwardly and rearwardly, and projecting laterally on each side to some distance beyond the lateral planes of the vehicle structure, and means for at will fixing the degree of such downward inclination.

In testimony whereof I affix my signature in presence of two witnesses.

TIMOTHY C. DOBBINS.

Witnesses:
 JAMES L. CRAWFORD,
 WILLIAM H. HUTCHINSON.

Copies of this patent may be obtained for five cents each, by addressing the "Commissioner of Patents, Washington, D. C."